Figure 1:
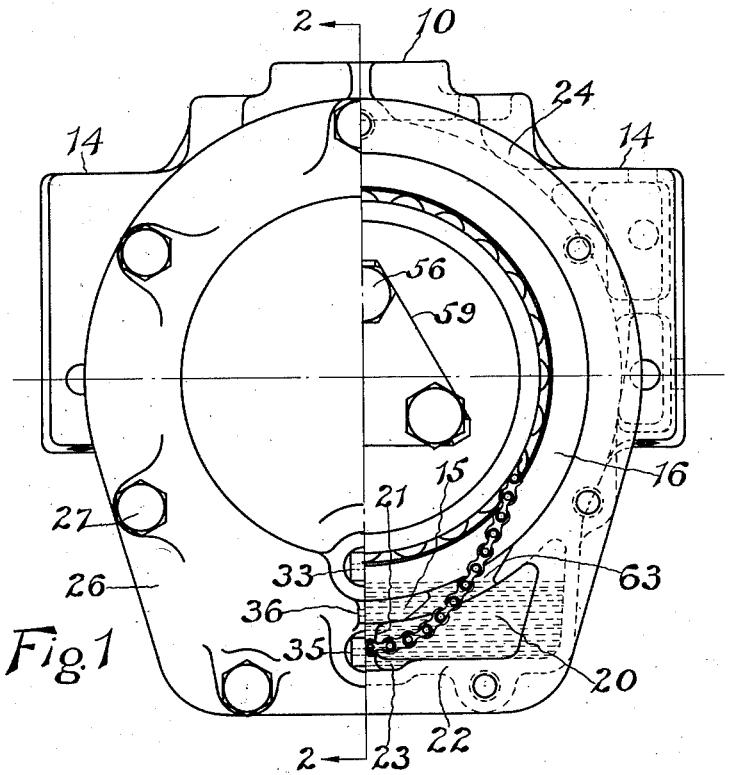

June 23, 1936.    W. H. WHITACRE    2,045,005
JOURNAL BOX ASSEMBLY
Filed Aug. 15, 1932    2 Sheets-Sheet 2

—INVENTOR—
William H. Whitacre
By
  ATTORNEYS

Patented June 23, 1936

2,045,005

UNITED STATES PATENT OFFICE 2,045,005

JOURNAL BOX ASSEMBLY

William H. Whitacre, Cleveland Heights, Ohio

Application August 15, 1932, Serial No. 628,800

19 Claims. (Cl. 308—180)

My invention relates to a journal box assembly embodying anti-friction bearings, preferably tapered roller bearings, capable of taking both radial and end thrust loads, and which is particularly well adapted for use on railroad freight and passenger cars as well as on the larger sizes of industrial cars.

An object of the invention is to provide a journal box, for anti-friction bearings, that will be simple and rugged in construction, having few parts easy to cast in the foundry, and inexpensive to machine.

Another object of the invention is to provide a journal box assembly, embodying anti-friction bearings, which is adapted to utilize the standard American Railway Association axle shaft with the least possible amount of alteration on this shaft, and wherein the adjustment of the bearings to suitable running condition may be positively obtained without recourse to the more expensive practice of cutting threads at the axle shaft end and providing a nut by which the bearing adjustment is to be made.

Another object of the invention is to provide a journal box assembly, of the type referred to, in which the inner races of the bearings are positively retained against rotational or endwise movement with reference to the axle shaft, without resorting to a heavy press fit of these races on the shaft. The employment of a light press fit between these parts will permit withdrawal of the inner races from the axle shaft at such times as a "wheel change" is required or when it is desired to replace worn bearings, without requiring a powerful machine press. The inner races may be assembled onto the axle shaft by simply warming them in hot oil, when they can be readily slipped into position. Journal boxes of this improved construction can therefore be applied to or removed from car axle shafts at locations remote from the facilities of a car repair shop.

A further object of the invention is to provide a journal box assembly, embodying tapered roller bearings, in which oil may be used as a lubricant for such bearings without over-lubrication and consequent churning of the oil and in which the oil is fed into the upper portion of the roller bearing, by being elevated from a reservoir in the base of the journal box, and follows a natural circulation through the bearing, viz., from the small end toward the large end of the tapered rollers.

It is also an object of this invention to provide an improved journal box assembly which is so constructed that the oil is efficiently retained against loss by leakage from the box.

Heretofore, the oil level in journal boxes having roller bearings has generally been maintained at about the center of the lowest rollers. Under such conditions the rollers, in passing through the oil, pick up an excessive amount, and over-lubrication of the roller bearings as well as considerable churning of the oil occurs. Such an operating condition has, heretofore, generally resulted in an objectionable rise in temperature of the bearings and lubricant. By the use of the improved lubricating means of my invention, I find that these objectionable conditions can be eliminated and adequate lubrication still maintained. As will be explained more fully hereinafter, I accomplish this desired end by establishing the level of lubricant in the reservoir at a plane below the rollers and by providing a lubricant elevator which, in combination with the tapered rollers, causes a continuous flow of lubricant through the bearing while in motion.

Other desirable features of the invention will appear hereinafter.

Figure 3:
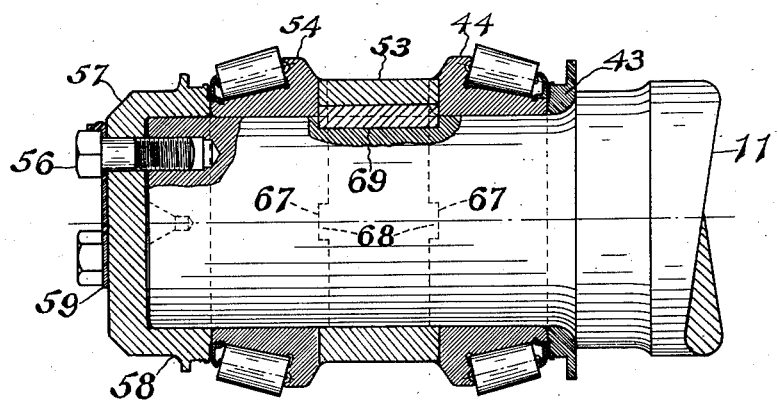
Figure 2:
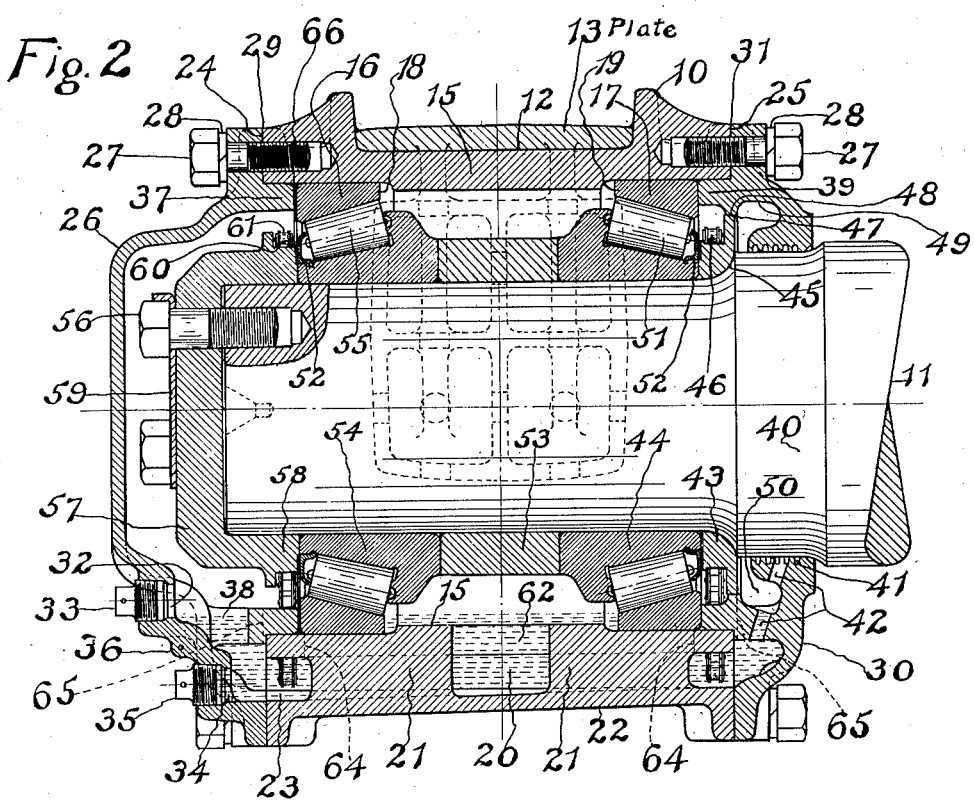
Figure 4:
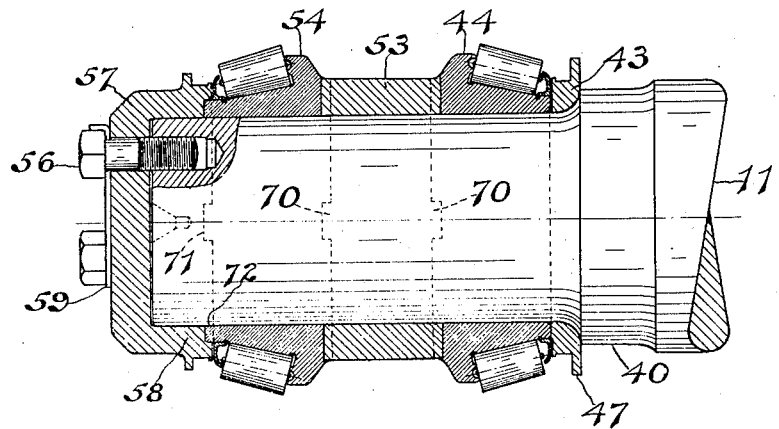

In the drawings, forming a part of this specification, and which illustrate the invention more fully, the left-hand portion of Fig. 1 is a front elevation of the journal box assembly, the right hand portion of this figure being a front elevation of the journal box assembly with the cover removed; Fig. 2 is a vertical section of the journal box assembly, taken on the line 2—2 of Fig. 1; Fig. 3 shows a modification of the means for retaining the inner races of the roller bearings on the axle shaft; and Fig. 4 shows another modification of this means.

In the drawings illustrating a preferred form of my journal box assembly, reference character 10 indicates the hollow journal box body into which the axle shaft 11 extends. On the upper side of this journal box body is provided a substantially rectangular depression 12, into which may be placed a steel wearing-plate 13 having its upper surface curved and hardened. The axis of curvature of this upper surface is at right angles to the axis of the axle shaft. The load on the car truck is carried from the truck to the journal box through this wearing-plate. Guide boxes 14, formed externally on each side of the journal box body 10, coact with adjoining depending portions of the car truck to position the journal box assembly within the truck. The contour of the wearing plate and of the external surfaces of the guide boxes and of the journal box body, as well as of the car truck, is such as to permit the journal box to freely align itself at all times with the axle shaft. Inasmuch as track irregularities cause considerable weaving of the car trucks when a railroad car is in motion, it is known to those skilled in the art to be positively essential to the successful use of roller bearings that the journal box shall have a free, self-aligning mounting in the car truck, and this requirement is fully met in the present construction.

The mid portion 15 of the journal box body 10, surrounding the axle shaft 11, is substantially tubular in form and the interior surface adjoining each end is finished to receive the outer races 16 and 17 of the bearings 18 and 19 which are here shown as and are preferably of the tapered roller type. The lower part of the journal box body is formed into a reservoir 20 for a suitable lubricant, preferably oil. Ribs 21 may be provided to extend between the bottom wall 22 and the mid portion 15 of the journal box body to increase the rigidity of the structure. Along each side of the ribs 21 the bottom wall is depressed to form an inclined lubricant trough 23 leading toward the front of the journal box assembly.

Front and rear ends of the journal box body 10 are provided with flanged faces 24 and 25, preferably similar in contour. To the end face 24 is attached the front cover 26, as by means of the bolts 27 and lock washers 28. A suitable gasket 29, preferably substantially non-compressible, may be employed to make the joint oil-tight. To the opposite end face 25 is attached a rear cover 30, as by means of similar bolts 27 and lock washers 28. A suitable gasket 31, similar to the gasket 29, may be employed to make the latter joint oil-tight.

The front cover 26 has on its outer face an opening 32 which is normally closed by a threaded plug 33. The location of this opening, with reference to the lubricant reservoir 20, determines the level at which it is intended that the lubricant should be maintained when the journal box assembly is in service. Also, lubricant may be introduced into the reservoir through this opening when it becomes necessary to replenish or renew the supply. A similar opening 34, on the front cover 26 at approximately the level of the trough 23 in the reservoir, serves as an outlet to drain off old lubricant from the reservoir when it is desired to renew the supply. This opening is normally closed by a threaded plug 35. A hole drilled in a boss 36, provided on the outer face of the front cover 26, together with similar holes in plug 33 and in plug 35, makes it easily possible to seal supply and drain openings against unwarranted tampering by connecting both plugs to the boss 36 with wire. If preferred, the two plugs may be wired directly together, in which case the boss 36 would not be required.

A projecting annular flange 37, formed on the front cover 26 and extending into the opening of the mid portion 15 of the journal box body, provides an abutment for the outer race 16 of the bearing 18. Through the lower portion of this flange, adjacent the wall of the front cover, is an opening 38 which serves as a passageway for lubricant to flow downward to the reservoir 20 when the supply is replenished through the filler opening 32. A projecting annular flange 39 is formed on the rear cover 30 and likewise extends into the mid portion 15 of the journal box body. This annular flange serves as an abutment for the outer race 17 of the bearing 19.

Adjacent the axle shaft 11, the rear cover is finished by machining to a close running clearance around an enlarged portion 40 of the shaft. Oil-collecting grooves 41 are formed within this portion of the rear cover to afford an additional provision against the escape of lubricant along the shaft, and a hole 42 drilled through a lower part of the rear cover connects these oil grooves with the reservoir 20 below, thus providing a channel by which oil received in the grooves may flow back into the reservoir.

An annular collar 43, engaging and positioned between the inner bearing race 44 and the rounded shoulder 45, on the axle shaft 11, carries an endless pin and link chain 46. The function of this chain is to elevate oil from the reservoir 20 to the bearing 19 adjoining it, for the accomplishment of a lubricating action which will be presently explained.

A portion of the collar 43 is enlarged to such diameter that its periphery 47 has a close running clearance with an annular surface 48 formed on the interior of the flange 39 of the rear cover. Since the clearance between the periphery 47 of the collar 43, and the annular surface 48 on the interior of the rear cover is slight, very little oil brought up by the chain 46 from the reservoir below can find its way between these parts.

As explained above, the opening 32 determines the level for lubricant in the reservoir and, in this connection, it will be noted that I have arranged the annular surface 48 of the box, and the radial flange of the collar 43 cooperating therewith, so that these parts are substantially above the level of the lubricant standing in the reservoir. In other words the flange of the collar 43 does not dip into the body of lubricant in the reservoir and hence does not pick up lubricant from the reservoir but is at all times above such lubricant level and can therefore cooperate with the localized annular surface to form an efficient dam or seal.

It is an established fact that a tapered roller bearing, when in motion, acts like a pump on any fluid coming in contact with the rollers, drawing the fluid through the bearing—in at the small end of the rollers and out at the large end. In consequence, practically all of the oil elevated by the chain 46 will be drawn through the adjoining bearing. Such small amount of oil as does work its way past the periphery 47 of the collar 43 will be collected on the interior surface 49 of the annular recess 50 formed in the rear cover 30, and will then find its way back into the reservoir below through the hole 42. From the foregoing it will be evident that adequate provision against loss of lubricant from the journal box assembly, while it is in service, has been embodied in the construction illustrating the invention; that the sealing means employed is simple, inexpensive and effective; that this sealing means is located wholly above the level of the lubricant in the reservoir; and that there are no parts of the sealing means in rubbing contact with each other to cause wear and gradually lose effectiveness, the results being accomplished rather by directing the flow of the lubricant away from the sealing means through the cooperation of adjacent parts.

Adjacent the collar 43, and positioned longitudinally on the axle shaft 11 by means of this collar, is the inner race 44 of the bearing 19. The tapered rollers of this particular bearing are indicated at 51, the rollers being prevented from falling away from the inner race 44, while the bearing is being handled during assembly or disassembly of the journal box, by a spring locking ring 52, which engages in a groove on the inner race. It will be understood that the specific design or construction of the bearings 18 and 19 per se forms no part of the present invention.

Spaced along the shaft 11 from the inner race 44 by a sleeve 53, is the inner race 54 of the bearing 18. Tapered rollers for the latter bearing are shown at 55, these rollers being also retained by a spring locking ring, as previously explained. Covering the end of the axle shaft 11, and secured thereto by bolts 56, is a cap 57 having an extended annular portion 58 of sufficient length to abut the inner race 54 previously referred to. Clearance is provided between the axle shaft end and the adjacent end face of the cap 57 so that, when the retaining bolts 56 are drawn up, pressure will be exerted by the cap on the associated parts on the axle shaft, viz., the inner race 54, the sleeve 53, the inner race 44, and the collar 43, so as to result in fixedly securing these parts against endwise movement on the axle shaft. A light press fit is employed in applying the inner races of the bearings to the axle shaft, and it will be seen that the holding effect of this light press fit, together with the clamping action of the cap, will result in the inner races of the bearings being interlocked and securely retained against rotational movement with reference to the axle shaft.

A locking plate 59, having suitable portions which may be bent up against hexagonal faces of the heads of bolts 56, is retained against the cap 57 by these bolts. Positively locking the bolts in this manner insures that they will not loosen from jar, vibration, or the pressure on the cap which may come from end thrusts received on the inner race 44 tending to force the cap off the axle shaft. Such end thrusts may be encountered when the journal box is in service, although the principal end thrusts will undoubtedly be received on the bearing having the inner race 54. Such principal end thrusts react against the rounded shoulder, on the axle shaft 11, through the collar 43, and the associated parts on the axle shaft, and no strain is placed on the cap 57 and the bolts 56 which retain it on the axle shaft, due to such principal end thrusts. Thus the clamping action of the cap on the inner races of the bearings is not diminished or otherwise affected by such principal end thrusts.

The external portion 60 of cap 57, which is adjacent the inner race 54, is adapted to carry an endless pin and link chain 61 similar to chain 46. The function of chain 61 is similar to that of chain 46, siz., to elevate oil from the reservoir 20 to the bearing adjoining it, and to introduce the oil into the upper portion of the bearing. It will be noted that the chains 46 and 61 are so positioned with relation to the bearing adjoining each, that the oil which is elevated by the chain reaches the bearing at the small end of the rollers. By capillary attraction and surface tension, as well as by the movement of the parts causing a flow of the oil, the latter is brought into contact with the rollers. When this occurs, the action of the tapered construction of the roller bearing is brought into play, which is to draw the oil in at the small end of the rollers, pass it through the bearing toward the large end of the rollers, and eventually to eject it from the bearing. In this respect the tapered roller bearing acts as a pump to force the oil in a definite general direction and thereby create a circulation through the bearing. After passing out of the bearing, the oil collects on the mid portion 15 of the journal box body in a space provided between the adjacent large ends of the bearings and drains from there back into the reservoir 20 through an opening indicated at 62 in the lower part of the wall of the mid portion.

An important advantage in bringing the oil to the bearing so that it will be carried through the bearing from one side thereof to the other, and at the same time introducing the oil at the upper part of the bearing so that the general direction of lubricant flow is also downward, is to continually wash clean the working surfaces of the bearing races and the rollers. There is always a slight but continued loss, in the form of minute particles, from these metal surfaces due to wear in service. The abrading effect of such minute particles of hardened metal on the polished surfaces of the bearings, is thus minimized by their constant speedy removal in the circulating oil. Such sediment as they may create is deposited on the bottom of the reservoir and may be washed out of the latter prior to renewing the supply of oil.

The chains 46 and 61 depend from their carriers so that their lower portions reach nearly to the bottom of the reservoir 20. Consequently they will be immersed in the oil in the reservoir until the supply therein is nearly exhausted. By reason of this fact, a journal box assembly employing the lubrication means described may be operated for longer periods of service between inspection and replenishment of the oil than one in which the oil level must be maintained above the lowest point of the rollers to be effective.

To provide apertures through which the endless chains 46 and 61 may pass the mid portion 15 of the journal box body, as well as the annular flanges 39 of the rear cover and 37 of the front cover, there are recesses formed in the mid portion 15, as shown at 63 in Fig. 1, and corresponding recesses in the flanges 39 and 37, which latter recesses register with the recess 63 and follow the curvature of the chains. The width of the recesses longitudinally of the journal box body 10 is indicated for the mid portion 15 by dotted lines 64, and for the annular flanges 39 and 37 by dotted lines 65.

Thin shims 66, interposed between the meeting faces of the front cover flange 37 and the adjoining outer race 16 of the bearing 18, afford a means to compensate, at assembly, for inaccuracies in machining the various parts and to adjust the bearings to suitable running condition. After the journal box has been in service and wear has occurred in the bearings themselves, one or more thin shims may be added to readjust the bearings to an efficient running condition. The shims may readily be inserted by first removing the front cover 37 from the journal box body 10.

For certain operating conditions, it may be desirable to hold the inner races of the bearings against rotational movement with reference to the axle shaft more positively than has already been indicated in the foregoing description. It is not feasible to introduce any form of mechanical retainer, such, for instance, as a key, between the inner race itself of the bearing and the axle shaft. To do so invites trouble and break-down in the operation of the bearing by reason of such device affecting the concentricity and rigidity of the inner race, and, consequently, the load capacity of the bearing. Also, for reasons already stated, the use of a heavy press fit between the inner races and the axle shaft is undesirable because of the difficulty and expense of applying and removing the inner races under such conditions.

It is, accordingly, an additional feature of the present invention to provide means by which this desired result may be attained. This is accomplished in the following manner: Referring to Fig. 3, it will be noted that at their meeting faces with the sleeve 53, the inner races 44 and 54 may be provided with recesses in these faces, preferably rectangular in form, as indicated at 67. Mating with these recesses are corresponding projections 68 on the end faces of the sleeve 53, so that when assembled in position on the axle shaft 11, the inner races 44 and 54 will be interlocked and positively retained against rotational movement with reference to the sleeve. This sleeve in turn is engaged by a key 69, sunk into the axle shaft 11. The desired result is thus seen to be attained by locking the inner races to an intermediate member which, in turn, may be locked to the axle shaft.

Another manner of reaching the same end is shown in Fig. 4, wherein the faces of the inner races 44 and 54, which meet the sleeve 53, are recessed, and there are corresponding projections 70 on the adjoining end faces of sleeve 53, the construction thus far being identical with that shown in Fig. 3. The end face of the cap 57, which adjoins the inner race 54, may have recesses 71 formed therein which are engaged by corresponding projections 72 on the associated end face of the inner race 54. The recesses may, if desired, be formed on the face of the inner race 54, the corresponding projections being on the meeting face of the cap 57. In the construction just described, and, as shown in Fig. 4, the inner race 44 is positively held against rotational movement with reference to the sleeve 53, which in turn bears the same relation to the inner race 54. Inasmuch as the inner race 54 is positively held by the cap 57, and the cap is retained against rotational and endwise movement with reference to the axle shaft by the bolts 56, it is evident that the desired result may also be accomplished by holding the two inner races against relative rotational movement through the medium of an intermediate member and retaining them against such movement with reference to the axle shaft through a second member.

In disclosing my invention, I have referred to my improved journal box assembly as being intended for use particularly on the trucks of railroad cars, but it should be understood that this improved device may be applied to various other vehicles and machines. It should also be understood that, although I have shown my journal box assembly as embodying only two bearings, any desired number of bearings may be employed as determined by the load to be carried or other conditions of service. It is pointed out further in this connection that the arrangement of lubricant elevating means adjacent the small diameter ends of the rollers of a tapered roller bearing provides for a novel and efficient lubricating function, which is by no means limited in its utility to the journal boxes of railway trucks, but may be embodied in or applied to various other machines and mechanical devices.

From the foregoing description and the accompanying drawings, it will now be readily seen that I have provided an improved journal box assembly which embodies anti-friction bearings and which is very durable and efficient in operation when applied to previously constructed railway cars as well as when applied to new cars under construction. In the novel construction which I have provided, it will be seen that the pumping action of a tapered roller bearing is utilized in connection with a lubricant elevator and that such means insures a reliable and adequate supply of lubricant for the rollers and races of the bearing, and also results in a washing of abrasive particles away from the surfaces of these bearing parts. In my novel journal box assembly, it will also be seen that the inner races of the bearings are correctly positioned on the axle shaft and are securely held against rotation by simple and efficient retaining means which eliminates the need for a heavy press fit between the inner races and the axle shaft. Moreover, it will be seen that the lubricant retaining means which I have provided prevents leakage of lubricant around the axle shaft and thereby conserves the lubricant supply, and that this efficient sealing action is attained by the use of surfaces arranged to positively control the direction of lubricant flow and without the use of packings or the like which are subject to rubbing contact and consequent wear.

Various changes in the construction and arrangement of the several parts herein shown and described may be employed without departing from the spirit of the invention as defined in the appended claims. Furthermore, in so far as certain features of my invention are concerned, I may employ, instead of tapered roller bearings, other types of anti-friction bearings such as ball bearings.

Having thus described my invention, I claim:

1. In combination, a hollow journal box, a shaft end extending into said box, a plurality of anti-friction bearings supporting the shaft end in the box, said bearings having inner races disposed around said shaft end, means for interlocking said races, and retaining means connected with said shaft end and interlocked with one of said races, said retaining means being effective for exerting an axial clamping action on said inner races and said interlocking means.

2. In combination, a hollow journal box, a shaft end extending into said box, a plurality of anti-friction bearings supporting the shaft end in the box, said bearings having inner races disposed around said shaft end, a spacer disposed between and interlocked with said inner races, and retaining means connected with said shaft end and interlocked with one of said races, said retaining means being effective for exerting an axial clamping action on said inner races and said spacer.

3. In combination, a hollow journal box, a shaft end extending into said box, a plurality of anti-friction bearings supporting the shaft end in the box, said bearings having inner races disposed around said shaft end, an abutment on said shaft end on one side of said bearings, a spacer between said bearings, means connecting the ends of said spacer with said inner races, a cap connected to said shaft end on the other side of said bearings, means connecting the inner race of the outermost bearing with said cap, and means whereby said cap maintains said inner races and said spacer clamped between the cap and said abutment.

4. In combination, a journal box having a lubricant reservoir therein, a shaft extending into said box, a tapered roller bearing between said shaft and said box, said reservoir providing a lubricant level wholly below said bearing, and an elevator for delivering a continuous supply of lubricant from said reservoir to the small ends of the rollers whereby lubricant is caused to flow through the bearing by the pumping action of the tapered rollers.

5. In combination, a journal box having a lubricant reservoir therein, a shaft extending into said box, a bearing between the shaft and the box, said bearing comprising an annular series of tapered rollers, and an elevator adjacent the small ends of said rollers for supplying lubricant thereto from said reservoir.

6. A railway car journal box comprising in combination a housing having a lubricant reservoir formed at the bottom thereof, a shaft extending into said housing, a bearing between the shaft and the housing, said bearing comprising an annular series of tapered rollers, and an endless device disposed adjacent the small ends of said rollers for elevating lubricant from said reservoir and feeding it continuously to said small ends.

7. In combination, a journal box having an opening therein, a shaft extending into said box through said opening, bearing means providing supporting cooperation between the shaft and said box, means for lubricating said bearing means including a lubricant reservoir below the bearing means and a lubricant elevator, and means for preventing the escape of lubricant through said opening including a substantially radially extending flange on said shaft and an annular surface on said box in which said flange is rotatable with small radial clearance, said annular surface and said radially extending flange being so disposed that the adjoining portions thereof lie substantially above the lubricant in the reservoir and said bearing means and said elevating means being so disposed as to direct the lubricant away from said opening.

8. In combination, a journal box having an opening therein, a shaft extending into said box through said opening, bearing means providing supporting cooperation between the shaft and said box, means for lubricating said bearing means including a lubricant reservoir below the bearing means and a lubricant elevator, and means for preventing the escape of lubricant through said opening comprising a substantially radially extending flange on said shaft, an annular surface on said box in which said flange is rotatable with small radial clearance, said annular surface and said radially extending flange being so disposed that the adjoining portions thereof lie substantially above the lubricant in the reservoir and said bearing means and said elevating means being so disposed as to direct the lubricant away from said opening, and a collecting chamber around said shaft outwardly of said flange.

9. In combination, a journal box having an opening therein, a shaft extending into said box through said opening, bearing means providing supporting cooperation between the shaft and said box, means for lubricating said bearing means including a lubricant reservoir below the bearing means and a lubricant elevator, and means for preventing the escape of lubricant through said opening comprising a substantially radially extending flange on said shaft, an annular surface on said box in which said flange is rotatable with small radial clearance, said annular surface and said radially extending flange being so disposed that the adjoining portions thereof lie substantially above the level of the lubricant in the reservoir and said bearing means and said elevating means being so disposed as to direct the lubricant away from said opening, other sealing means around said shaft outwardly of said flange, and an annularly extending collecting chamber between said sealing means and said flange.

10. In combination, a journal box having an opening therein, a lubricant reservoir in said box, a shaft extending into said box through said opening, a tapered roller bearing providing supporting cooperation between the shaft and said box, an annularly extending surface on said box around said opening, a substantially radially extending annular flange carried by said shaft and rotatable within said annularly extending surface with small clearance for lubricant retaining purposes, and an endless elevator intermediate said flange and the small ends of the rollers for supplying lubricant from said reservoir to said small ends.

11. In combination, a journal box having an opening therein, a lubricant reservoir in said box, a shaft extending into said box, a tapered roller bearing providing supporting cooperation between the shaft and said box, an annularly extending surface on said box around said opening, a substantially radially extending annular flange carried by said shaft and rotatable within said annularly extending surface with small clearance for lubricant retaining purposes, an endless elevator intermediate said flange and the small ends of the rollers for supplying lubricant from said reservoir to said small ends, and an annular chamber on the other side of said flange for collecting lubricant and returning the same to said reservoir.

12. In combination, a journal box having a lubricant reservoir therein, a shaft extending into said box, a tapered roller bearing between said shaft and box, sealing means adjacent the small ends of the rollers of said bearing, and means intermediate said sealing means and the small ends of the rollers for supplying lubricant from said reservoir to the latter whereby lubricant is caused to flow through the bearing by the pumping action of the tapered rollers.

13. In combination, a journal box having a lubricant reservoir therein, a shaft extending into said box, a bearing between the shaft and the box, said bearing comprising an annular series of tapered rollers, sealing means adjacent the small ends of said rollers, and an endless device disposed intermediate said sealing means and the small ends of the rollers for elevating lubricant from said reservoir and feeding it to said small ends.

14. In combination, a journal box having a lubricant reservoir therein, a shaft extending into said box, a plurality of bearings between the shaft and the box each comprising an annular series of tapered rollers, means providing an annular space between said bearings which communicates with said reservoir, and means for supplying lubricant from said reservoir to each of said bearings at the small ends of the rollers thereof whereby lubricant is caused to flow through the bearings and into said annular space.

15. In combination, a journal box having an opening thereinto, a lubricant reservoir in said box, a shaft extending into said box through said opening, means sealing said shaft around said opening, an antifriction bearing between said shaft and box, and a lubricant elevator between said seal and said bearing for supplying lubricant to the latter from said reservoir.

16. In combination, a journal box having an opening therein, a lubricant reservoir in said box, a shaft extending into said box through said opening, an antifriction bearing between said shaft and box, an annularly extending surface on said box around said opening, a substantially radially extending annular flange carried by said shaft and rotatable within said annularly extending surface with small radial clearance for lubricant retaining purposes, and an endless elevator intermediate said flange and said bearing for supplying lubricant to the latter from said reservoir.

17. In combination, a journal box having an opening therein, a lubricant reservoir in said box, a shaft extending into said box through said opening, an antifriction bearing between said shaft and box, an annularly extending surface on said box around said opening, a substantially radially extending annular flange carried by said shaft and rotatable within said annularly extending surface with small radial clearance for lubricant retaining purposes, an endless elevator intermediate said flange and said bearing for supplying lubricant to the latter from said reservoir, and an annular chamber on the other side of said flange for collecting lubricant and returning the same to the reservoir.

18. In combination, a journal box having a lubricant reservoir therein, a shaft extending into said box, a pair of antifriction bearings between said shaft and box, said bearings being spaced apart and having therebetween a lubricant return space communicating with said reservoir, and a lubricant elevator adjacent each bearing at the end thereof opposite said return passage for supplying lubricant to the bearings from the reservoir.

19. In combination, a journal box having a lubricant reservoir therein, a shaft extending into said box, a pair of tapered roller bearings between said shaft and box with the small ends of the bearings extending away from each other, said bearings being spaced apart and having between their adjacent large ends a lubricant return passage communicating with said reservoir, and a lubricant elevator adjacent each bearing at the end thereof opposite said return passage for supplying lubricant to the small ends of the bearings from the reservoir.

WILLIAM H. WHITACRE.